US007013637B2

(12) United States Patent
Yoshida

(10) Patent No.: US 7,013,637 B2
(45) Date of Patent: Mar. 21, 2006

(54) EXHAUST PURIFICATION APPARATUS AND METHOD FOR INTERNAL COMBUSTION ENGINE

(75) Inventor: Iwao Yoshida, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/609,627

(22) Filed: Jul. 1, 2003

(65) Prior Publication Data

US 2004/0020190 A1 Feb. 5, 2004

(30) Foreign Application Priority Data

Aug. 1, 2002 (JP) ............................. 2002-225239

(51) Int. Cl.
*F01N 3/00* (2006.01)

(52) U.S. Cl. ............................ 60/285; 60/274; 60/295; 60/286; 60/303

(58) Field of Classification Search .................. 60/274, 60/285, 286, 295, 300, 303
See application file for complete search history.

(56) References Cited

U.S. PATENT DOCUMENTS 5,501,074 A 3/1996 Suetsugu et al.
6,141,960 A * 11/2000 Takami et al. ................ 60/286
6,161,377 A 12/2000 Boegner et al.
6,233,923 B1 * 5/2001 Itou et al. ..................... 60/277
6,237,330 B1 * 5/2001 Takahashi et al. ............ 60/285
6,263,666 B1 * 7/2001 Kubo et al. .................... 60/277
6,341,487 B1 1/2002 Takahashi et al.
6,594,985 B1 * 7/2003 Surnilla et al. ............... 60/277
6,637,189 B1 * 10/2003 Boegner et al. .............. 60/274
6,722,125 B1 * 4/2004 Pfalzgraf ..................... 60/295

FOREIGN PATENT DOCUMENTS

EP 0 560 991 A1 9/1993
EP 0 598 916 A1 1/1994
JP 2000-227022 A 8/2000
JP 2000-282848 A 10/2000
JP 2001-271685 A 10/2001

OTHER PUBLICATIONS

J. Heywood, "Internal Combustion Engine fundamentals", XP002312419, 1988, p. 146-148.

* cited by examiner

*Primary Examiner*—Thomas Denion
*Assistant Examiner*—Diem Tran
(74) *Attorney, Agent, or Firm*—Foley & Lardner LLP

(57) ABSTRACT

In exhaust purification apparatus and method for an internal combustion engine having an exhaust gas purification catalyst disposed in an exhaust passage of the engine, a poisoning release control of the exhaust gas purification catalyst is executed when a predetermined condition is established, the poisoning release control including a normal mode and an exhaust gas composition mode before the normal mode, and a manipulation parameter (for example, an ignition timing) of the engine related to an exhaust gas composition is manipulated in such a manner that a hydrogen concentration in the exhaust gas in the exhaust gas composition mode is higher than that in the normal mode.

34 Claims, 13 Drawing Sheets

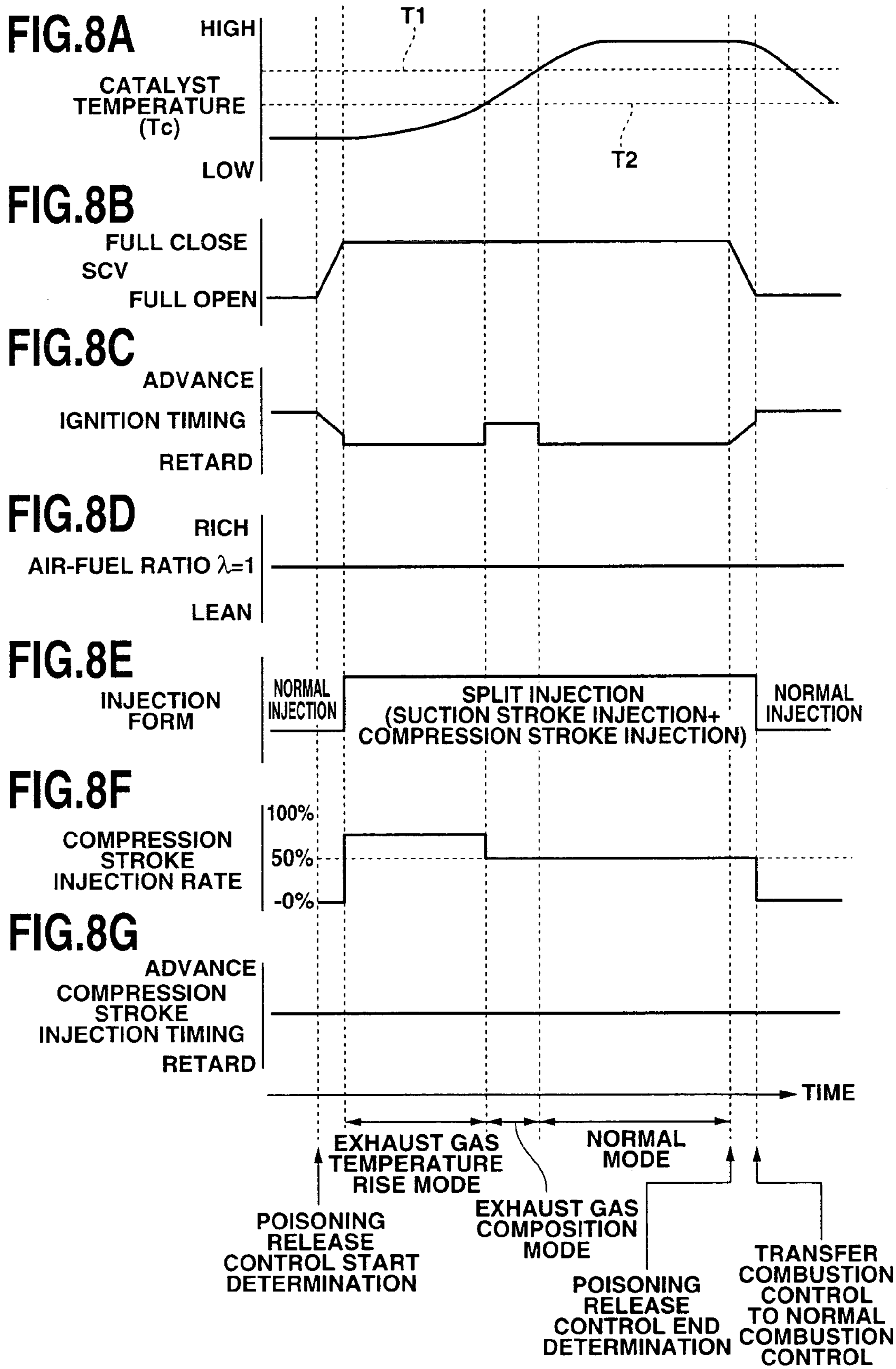

FIG.8A
HIGH
CATALYST TEMPERATURE (Tc)
LOW
T1
T2
FIG.8B
FULL CLOSE
SCV
FULL OPEN
FIG.8C
ADVANCE
IGNITION TIMING
RETARD
FIG.8D
RICH
AIR-FUEL RATIO λ=1
LEAN
FIG.8E
INJECTION FORM
NORMAL INJECTION
SPLIT INJECTION (SUCTION STROKE INJECTION+ COMPRESSION STROKE INJECTION)
NORMAL INJECTION
FIG.8F
COMPRESSION STROKE INJECTION RATE
100%
50%
-0%
FIG.8G
ADVANCE
COMPRESSION STROKE INJECTION TIMING
RETARD
TIME
EXHAUST GAS TEMPERATURE RISE MODE
NORMAL MODE
EXHAUST GAS COMPOSITION MODE
POISONING RELEASE CONTROL START DETERMINATION
POISONING RELEASE CONTROL END DETERMINATION
TRANSFER COMBUSTION CONTROL TO NORMAL COMBUSTION CONTROL

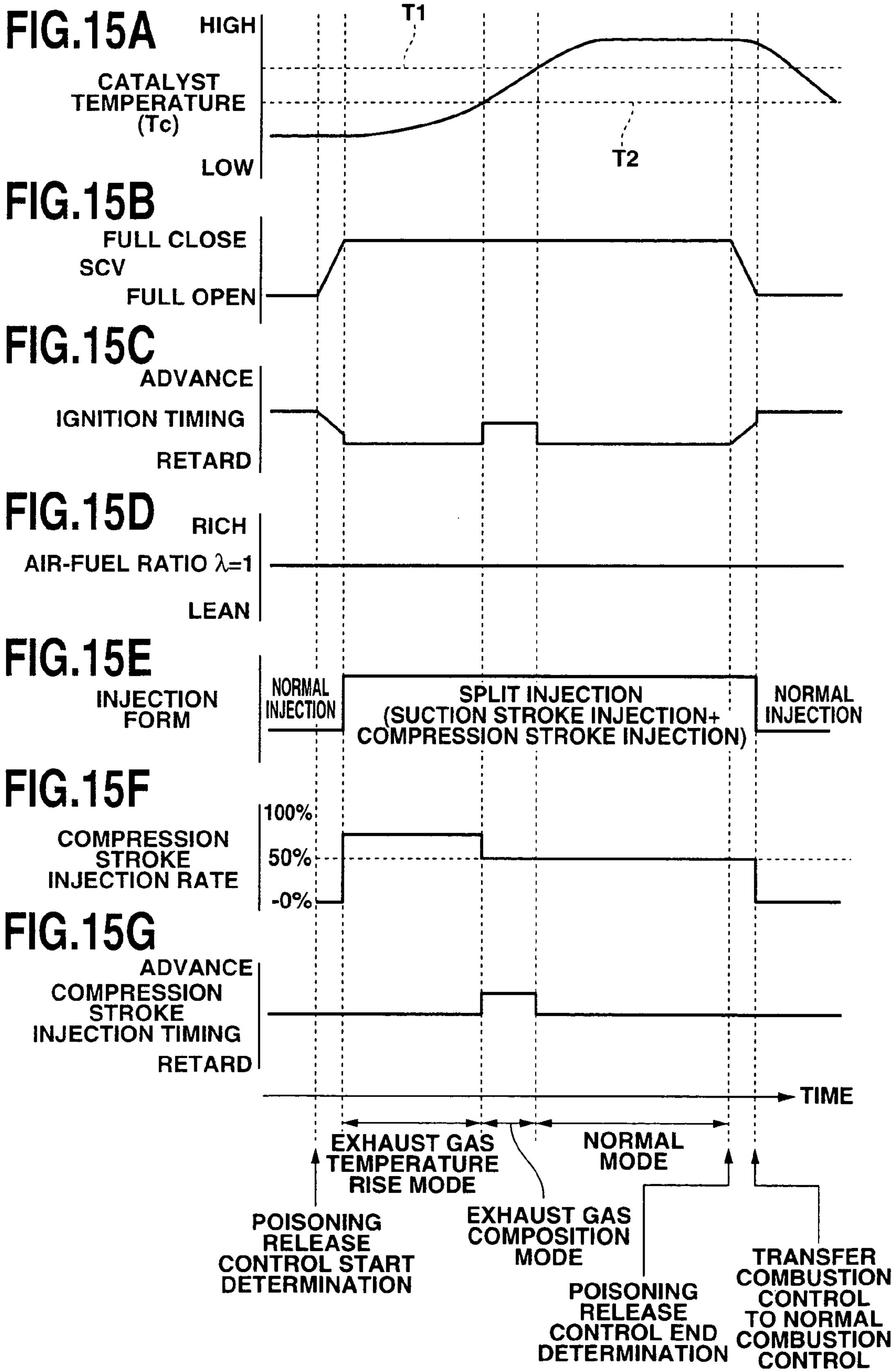
FIG.15A
HIGH
T1
CATALYST TEMPERATURE (Tc)
T2
LOW
FIG.15B
FULL CLOSE
SCV
FULL OPEN
FIG.15C
ADVANCE
IGNITION TIMING
RETARD
FIG.15D
RICH
AIR-FUEL RATIO λ=1
LEAN
FIG.15E
INJECTION FORM
NORMAL INJECTION
SPLIT INJECTION (SUCTION STROKE INJECTION+ COMPRESSION STROKE INJECTION)
NORMAL INJECTION
FIG.15F
COMPRESSION STROKE INJECTION RATE
100%
50%
-0%
FIG.15G
ADVANCE
COMPRESSION STROKE INJECTION TIMING
RETARD
TIME
EXHAUST GAS TEMPERATURE RISE MODE
NORMAL MODE
POISONING RELEASE CONTROL START DETERMINATION
EXHAUST GAS COMPOSITION MODE
POISONING RELEASE CONTROL END DETERMINATION
TRANSFER COMBUSTION CONTROL TO NORMAL COMBUSTION CONTROL

EXHAUST PURIFICATION APPARATUS AND METHOD FOR INTERNAL COMBUSTION ENGINE

BACKGROUND OF THE INVENTION

1. Field of the Invention

The present invention relates to exhaust purification apparatus and method for an internal combustion engine, the engine having an exhaust passage in which an exhaust (or exhaust gas) purification catalyst is mounted. The exhaust purification apparatus and method according to the present invention perform a poisoning release control of the exhaust purification catalyst when a predetermined condition is established.

2. Description of the Related Art

A Japanese Patent Application First Publication No. 2001-271685 published on Oct. 5, 2001 exemplifies previously proposed catalyst temperature controlling apparatus and method for a direct cylinder fuel injection internal combustion engine.

In the previously proposed catalyst temperature controlling method and apparatus, while, against a poisoning of sulfur of an NOx trap catalyst, a poisoning release thereagainst is being executed, an air-fuel ratio within a cylinder is set as $\lambda=1$ and a split of fuel injection into a suction stroke injection (fuel injection under the suction stroke) and a compression stroke injection (fuel injection under the compression stroke) is carried out to raise an exhaust (or exhaust gas) temperature. Thus, a temperature about the NOx trap catalyst is raised to a high temperature at which the poisoning release of sulfur is enabled. In addition, during an execution of the poisoning release, to suppress a worsening of a fuel consumption, as a demand (or request) on a rise in temperature of the catalyst becomes higher, a strength of an intake air ripple is weakened and the compression stroke fuel injection timing is retarded. In a case where a rate of the fuel injection quantity under the compression stroke to a total fuel injection quantity for four strokes of the engine per cylinder is varied from 20% to 60%, an exhaust gas temperature becomes higher as the rate of fuel injection quantity under the compression stroke becomes larger.

SUMMARY OF THE INVENTION

It is desirable that the poisoning release is finished in a time period as short as possible since the poisoning release control cannot avoid the worsening of a fuel economy to raise the exhaust gas temperature due to a promotion of an after burning.

However, in the previously proposed catalyst temperature controlling apparatus and method described above, the mutually similar controls before and after the catalyst temperature has reached to a high temperature required to release the poisoning are merely carried out. Since no consideration is given to an exhaust (or exhaust gas) composition, such an exhaust composition that a poisoning release performance gives an optimum is varied in accordance with the catalyst temperature. In spite of this fact, this is not effectively utilized. Therefore, a total time duration to end the poisoning release requires a long time. The worsening of the fuel economy cannot be suppressed.

It is, therefore, an object of the present invention to provide exhaust purification apparatus and method for an internal combustion engine which, when the poisoning release of the exhaust purification catalyst is carried out, can improve an efficiency of the poisoning release, can shorten a time it takes to perform the poisoning release, and can suppress the worsening of the fuel economy.

According to a first aspect of the present invention, there is provided an exhaust purification apparatus for an internal combustion engine, comprising: an exhaust gas purification catalyst disposed in an exhaust passage of the engine; and a controller that executes a poisoning release control of the exhaust gas purification catalyst when a predetermined condition is established, the poisoning release control including a normal mode and an exhaust gas composition mode before the normal mode, a manipulation parameter of the engine related to an exhaust gas composition being manipulated in such a manner that a hydrogen concentration in the exhaust gas in the exhaust gas composition mode is higher than that in the normal mode.

According to a second aspect of the present invention, there is provided an exhaust purification apparatus for an internal combustion engine, comprising: an exhaust gas purification catalyst disposed in an exhaust passage of the engine; and a controller that executes a poisoning release control of the exhaust gas purification catalyst when a predetermined condition is established, the poisoning release control including a normal mode and an exhaust gas composition mode before the normal mode, an ignition timing in the exhaust gas composition mode being set toward a more advance angle direction than that in the normal mode.

According to a third aspect of the present invention, there is provided with an exhaust purification method for an internal combustion engine, the internal combustion engine comprising: an exhaust gas purification catalyst disposed in an exhaust passage of the engine, and the exhaust purification method comprising: executing a poisoning release control of the exhaust gas purification catalyst when a predetermined condition is established, the poisoning release control including a normal mode and an exhaust gas composition mode before the normal mode; and, manipulating a manipulation parameter of the engine related to an exhaust gas composition in such a manner that a hydrogen concentration in the exhaust gas in the exhaust gas composition mode is higher than that in the normal mode.

According to a fourth aspect of the present invention, there is provided with an exhaust purification method for an internal combustion engines the internal combustion engine comprising: an exhaust gas purification catalyst disposed in an exhaust passage of the engine; and the exhaust purification method comprising: executing a poisoning release control of the exhaust gas purification catalyst when a predetermined condition is established, the poisoning release control including a normal mode and an exhaust gas composition mode before the normal mode; and setting an ignition timing in the exhaust gas composition mode toward a more advance angle direction than that in the normal mode.

This summary of the invention does not necessarily describe all necessary features so that the invention may also be a sub-combination of these described features.

BRIEF DESCRIPTION OF THE DRAWINGS

FIGS. 8A, 8B, 8C, 8D, 8E, 8F, and 8G are integrally a timing chart for explaining an operation of the poisoning release control executed in the first embodiment shown in FIG. 1 and FIG. 7.

FIGS. 15A, 15B, 15C, 15D, 15E, 15F, and 15G are integrally a timing chart for explaining an operation of the poisoning release control executed in the fourth embodiment of the exhaust purification apparatus according to the present invention.

DETAILED DESCRIPTION OF THE PREFERRED EMBODIMENTS

Reference will hereinafter be made to the drawings in order to facilitate a better understanding of the present invention.

Figure 1:
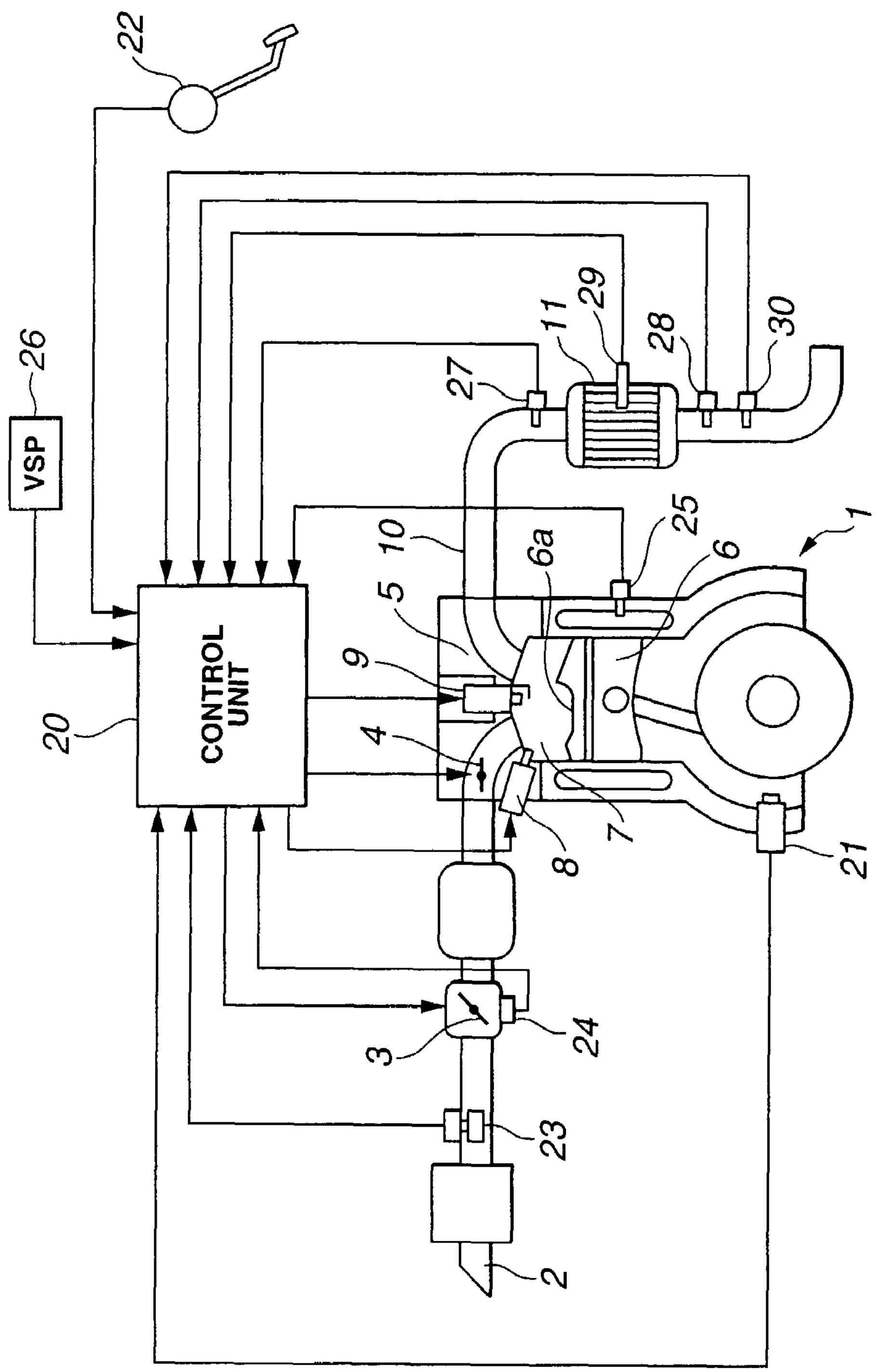
FIG. 1 is a rough system configuration view of an internal combustion engine to which an exhaust purification apparatus according to the present invention is applicable.

FIG. 1 shows a rough configuration view of an internal combustion engine to which an exhaust purification apparatus according to the present invention is applicable. Engine denoted by 1 has an intake passage 2 in which a throttle valve 3 to control an intake air quantity is mounted. Throttle valve 3 is an electronically controlled throttle valve activated by means of an actuator such as an electric motor (DC motor). A drive signal from a control unit (or also referred to as a controller) 20 drives throttle valve 3 to be opened or closed. A swirl control valve (SCV) 4 is disposed at a downstream side from a manifold section branched to each cylinder. Another drive signal from control unit 20 drives swirl control valve 4 to be opened or closed. A fuel injector (or called, a fuel injection valve) 8 is exposed to a combustion chamber 7 of each cylinder of engine 1, the combustion chamber being defined by a cylinder head 5 and a piston. 6. A crown surface of piston 6 is formed with a bowl portion (recess portion) **6*a* at a position eccentric thereon to an intake valve side. Fuel injector 8 is obliquely directed toward bowl portion 6*a* formed on the crown surface of piston 6 through the intake valve side. Fuel injector 8 has a solenoid to which a power is supplied in response to an injection pulse signal from control unit 20 so as to be opened. Thus, a predetermined amount of fuel whose fuel pressure is under a predetermined pressure is directly injected within combustion chamber 7. In a case where the fuel injection is carried out from fuel injector 8 under a suction stroke, the injected fuel is diffused into combustion chamber to form a homogeneous air-fuel mixture and is ignited and burned by means of a spark plug 9. Such a combustion as described above is called a homogenous combustion. With a combination of an air-fuel mixture ratio control, the homogeneous combustion is divided into a homogeneous stoichiometric combustion and a homogeneous lean combustion. In another case where the fuel injection is carried out under a compression stroke (especially, at a latter half portion of the stroke) from fuel injector 8, the injected fuel rides on a stream utilizing bowl portion 6*a* of piston crown surface to form a layer-like air-fuel mixture concentrated around spark plug 9 and is ignited and burned by means of spark plug 9**. Such a combustion as described above is called a stratified combustion. Since, usually, an air-fuel ratio is extremely lean, this combustion is called a stratified lean combustion.

On the other hand, an NOx trap catalyst 11 is disposed in exhaust passage 10 as an exhaust (gas) purification catalyst. NOx trap catalyst 11 has a three-way catalyst function to perform an oxidization of CO and HC (hydro carbon) in the exhaust gas and a reduction of NOx when an exhaust air-fuel ratio is placed in the vicinity to a stoichiometric air-fuel mixture ratio to trap NOx in the exhaust gas when the exhaust air-fuel mixture ratio is lean, to trap NOx in the exhaust gas when the exhaust air-fuel ratio is lean, and to reduce and purify the trapped NOx when the exhaust air-fuel ratio indicates the stoichiometric air-fuel ratio or richer than the stoichiometric air-fuel ratio.

Various signals from various kinds of sensors are inputted to control unit 20 to perform a control over engine 1.

A crank angle sensor 21 generates a crank reference signal and a crank unit angle signal in synchronization with an engine revolution. Control unit 20 measures a period of the crank reference angular signal of crank angle sensor 21 or counts the crank unit angle signal for a constant period of time to detect an engine speed Ne. An accelerator pedal sensor 22 detects an accelerator pedal manipulated variable varied according to a depression depth by a vehicle driver. An airflow meter 23 is disposed at an upstream side of throttle valve 3 of intake passage 2 and is used to detect an intake air quantity Qa. A throttle sensor 24 detects an opening angle TVO of throttle valve 3. An idle switch is incorporated into throttle sensor 24 which is turned to ON when throttle valve 3 is completely closed. A coolant temperature sensor 25 is exposed to a water jacket of engine 1 to detect a coolant temperature Tw. A vehicular velocity sensor 26 detects a vehicular velocity VSP. An air-fuel ratio sensor 27 is disposed at an upstream side with respect to NOx trap catalyst 11 in exhaust passage 10. Air-fuel ratio sensor 27 serves to detect the air-fuel ratio of an intake air-fuel mixture or exhaust air-fuel mixture by detecting a concentration of oxygen ($O_2$) in the exhaust gas and is used in a feedback control of the air-fuel ratio. It is noted that another air-fuel ratio sensor 28 is disposed at a downstream side with respect to NOx trap catalyst 11. This downstream side air-fuel ratio sensor 28 corrects the air-fuel ratio feedback control based on the detected value of air-fuel ratio sensor 27 and is used to suppress a control error as a result of a deterioration of air-fuel ratio sensor 27. A catalyst temperature sensor 29 is disposed within an internal of NOx trap catalyst 11 to detect a catalyst temperature Tc. Catalyst temperature Tc is used to switch a mode in the poisoning release control of NOx trap catalyst 11 (as will be described later). However, catalyst temperature Tc may be estimated from an engine driving condition without any sensor.

An NOx concentration sensor 30 is disposed at the downstream side with respect to NOx trap catalyst 11 in exhaust passage 10 to detect NOx concentration in the exhaust gas. This NOx concentration sensor 30 is used to detect a poisoning state (a state wherein NOx trap ability is worsened due to a poisoning of sulfur or a state wherein NOx trap ability (capability) is recovered due to the poisoning release) but, without any sensor such as the sensor described above, the poisoning state may be estimated by another estimation technique.

Control unit 20 includes a microcomputer having a CPU (Central Processing Unit), ROM (Read Only Memory), RAM (Random Access Memory), an A/D converter, an Input/output interface, and a common bus. Control unit 20 controls the opening angle of throttle valve 3, controls the open and closure of swirl control valve 4, sets and controls a fuel injection start timing and a fuel injection quantity through fuel injector 8, and controls an ignition timing of spark plug 9 at a set ignition timing in accordance with a driving condition detected on the basis of the signals from the above-described various sensors.

Then, the control of a combustion form is carried out in accordance with the driving condition. That is to say, at the time of a normal driving, the stratified lean combustion at a time of the fuel injection during the compression stroke under, for example, a low engine load region. On the other hand, under, for example, a high engine load region, either the homogeneous stoichiometric combustion due to an injection during the compression stroke or homogeneous lean combustion due to the injection during the suction stroke. NOx trap catalyst 11 traps NOx (for example, nitrogen oxide) in the exhaust gas when the exhaust air-fuel ratio indicates lean. Simultaneously, NOx trap catalyst 11 traps SOx (for example, sulfur oxide). The poisoning by SOx causes an NOx trap capability (including NOx reduction performance) to be reduced. Therefore, as a poisoning release control of SOx, the exhaust gas temperature is raised under a predetermined condition. Thus, the catalyst temperature is raised to the temperature needed to release the poisoning of SOx and this raised temperature is maintained for the predetermined period of time so that the poisoning of SOx can be released.

Specifically, the fuel injection is divided (split) into the injection under the suction stroke and that under the compression stroke so that a stratified air-fuel mixture which is relatively rich (A/F=about 10 through 16) is formed around spark plug 9 and a relatively lean (A/F=19 to 24) stratified air-fuel mixture over the whole combustion chamber 7 enclosing spark plug 9 is formed. It is noted that a whole air-fuel mixture ratio (the whole combustion chamber) is controlled so as to provide the substantially stoichiometric air-fuel ratio. Such a combustion form as described above is also called a stratified stoichiometric combustion (a stratified stoichiometric combustion caused by such a split fuel injection as described above.

The following items (1) through (4) describe concepts of the stratified stoichiometric combustion.

(1) Securing (Oxygen) $O_2$ required for an after burning by forming a lean air-fuel mixture in the vicinity to a wall surface of combustion chamber 7 caused by fuel injection during the suction stroke.

(2) The fuel injection at a time during the compression stroke causes a rich air-fuel mixture to be formed around spark plug 9 to improve an initial ignitability. Thus, a combustion stability can be improved.

(3) CO is generated according to the combustion of the lean air-fuel mixture in the vicinity to the wall surface of the combustion chamber and the after burning of the lean air-fuel mixture with $O_2$ is promoted so that a reduction of HC (hydro carbon) and a rise in exhaust temperature are achieved.

(4) The ignition timing can be retarded due to the improvement in the initial ignitability and the exhaust (gas) temperature rise due to the after burning effect caused by the retardation of ignition timing is furthermore be improved.

Hence, in the normal mode of the poisoning release control, the fuel injection is split into those during the suction stroke and during the compression stroke through a direct cylinder injection type fuel injector 8 and the ignition timing through spark plug 9 is set toward the retardation angle direction.

In the poisoning release control according to the present invention, in order to shorten a time it takes to release the poisoning and minimize the worsening of fuel consumption, an efficiency of the poisoning release before the catalyst temperature has reached to a temperature required to release the poisoning (a temperature at which the poisoning release performance becomes stable) is improved. In addition, in order to improve an exhaust gas temperature rise performance, an exhaust gas composition mode is set prior to the normal mode of the poisoning release control and, furthermore, an exhaust (gas) temperature rise mode is set before the exhaust (gas) composition mode. According to the catalyst temperature, the poisoning release control is executed in this order, viz., exhaust gas temperature rise mode→exhaust gas composition mode→normal mode.

Figure 2:
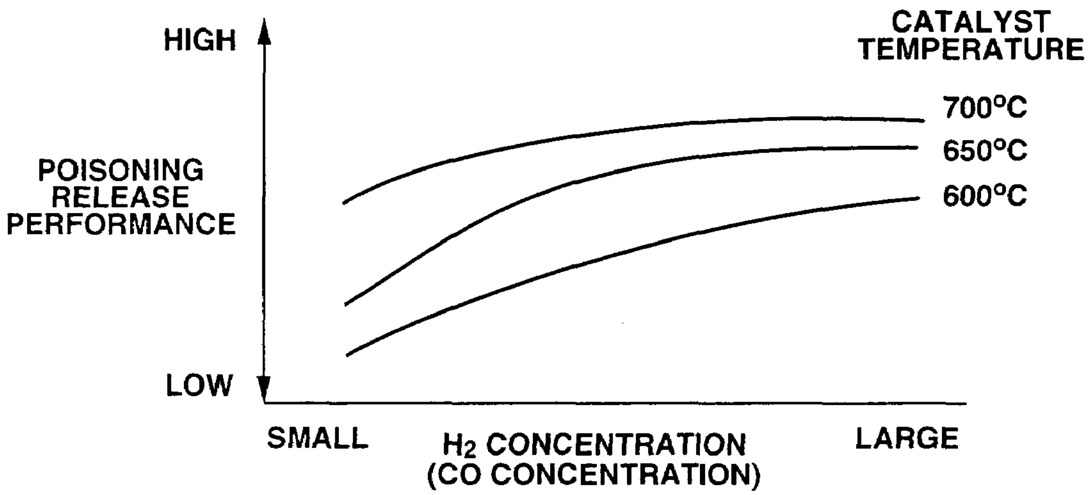
FIG. 2 is a characteristic graph representing a relationship between a hydrogen (H2) concentration and poisoning release performance with each catalyst temperature as a parameter.
Figure 3:
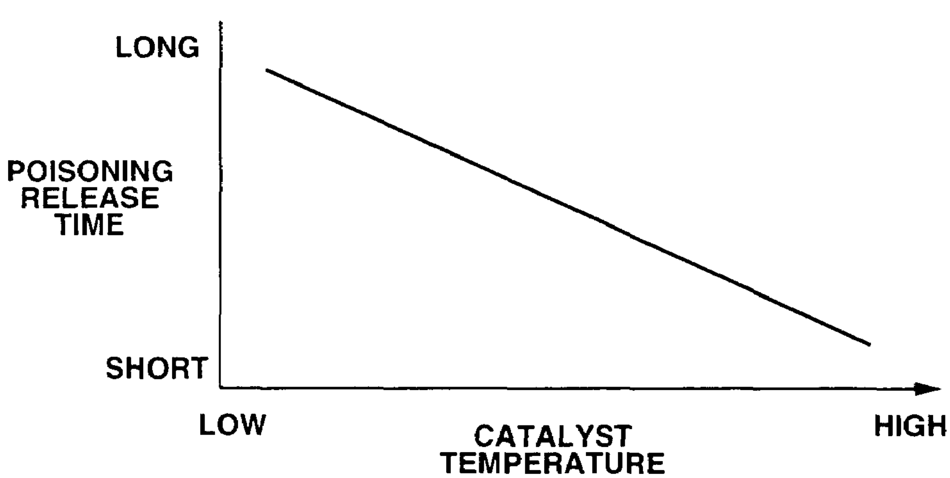
FIG. 3 is a characteristic graph representing a relationship between a catalyst temperature and a poisoning release time duration.

Prior to the details of the poisoning release control executed in the exhaust gas purification apparatus according to the present invention, characteristics (experimental results) of FIGS. 2 through 6 on the basis of the poisoning release control according to the present invention will be described below. FIG. 2 shows characteristic graphs representing a relationship between $H_2$ concentration (CO concentration) in the exhaust gas and a poisoning release performance with respective catalyst temperatures as parameters. It will be appreciated that, as catalyst temperature Tc is raised, the poisoning release performance is improved. At a relatively low temperature (600° C.) at which the poisoning release is started, the characteristic line is raised toward rightward direction (as the concentration of $H_2$ or CO becomes higher, the positioning release performance is raised gradually). At a relatively high temperature (650° C.) at which the poisoning release is stably carried out at a relatively high temperature direction or at an upper temperature (700° C.) than the temperature (650° C.), as the characteristic line approaches to a horizontal line, $H_2$ (or CO) concentration becomes lower. Consequently, even if HC concentration ($H_2$ (or CO) concentration) becomes low, it is indicated that a sufficient poisoning release function is obtained. Hence, it will be appreciated that a high concentration of the hydrogen ($H_2$) in the exhaust gas, with a range from 600° C. to 650° C. as the exhaust gas composition mode, is effective in the improvement in the poisoning release performance. It is noted that $H_2$ concentration in the exhaust gas is substantially in proportion to CO concentration and HC concentration. FIG. 3 shows a relationship between the catalyst temperature and a poisoning release time. As the catalyst temperature becomes higher, the poisoning release time can be shortened.

Figure 4A:
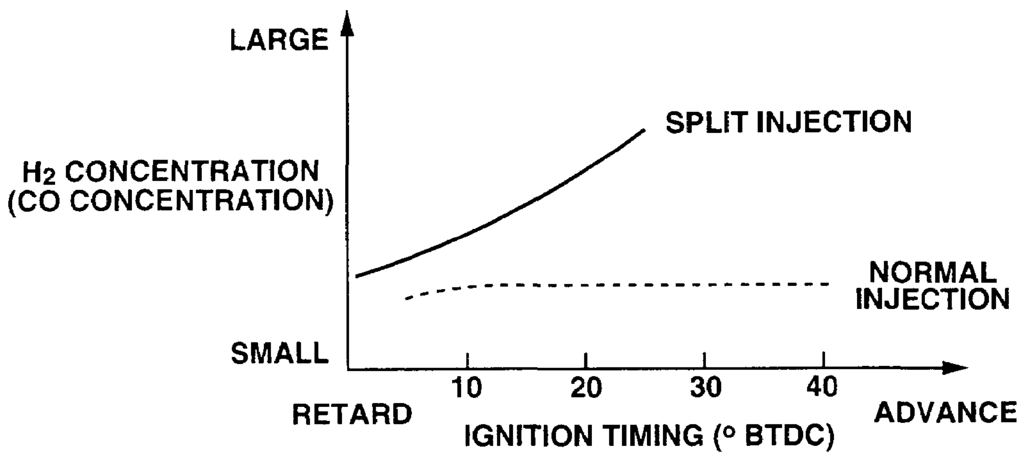
FIG. 4A is a characteristic graph representing the ignition timing and Hydrogen ($H_2$) concentration.
Figure 4B:
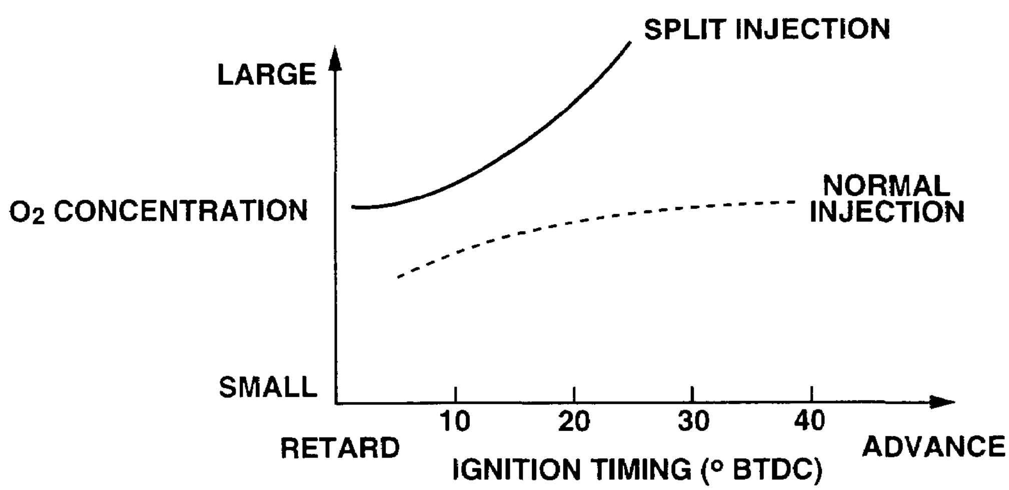
FIG. 4B is a characteristic graph representing the ignition timing and Oxygen ($O_2$) concentration.

FIG. 4A shows a relationship between the ignition timing and $H_2$ concentration (CO concentration) and divided according to the fuel injection timing of normal injection (suction stroke injection) and split fuel injection (fuel injection during the suction stroke+fuel injection during compression stroke). FIG. 4B shows a relationship between the ignition timing and $O_2$ concentration in the exhaust gas according to the normal injection (suction stroke injection) and the split injection (suction stroke injection+compression stroke injection). In the case of the split injection, the advance of the ignition timing is carried out so that $O_2$ concentration in the exhaust gas can be increased.

Figure 5:
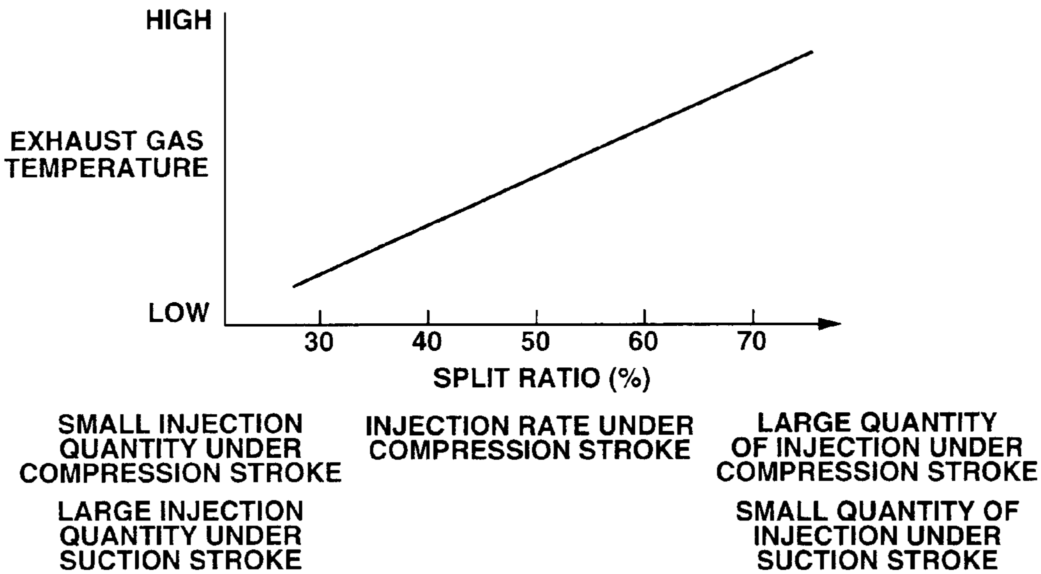
FIG. 5 is a characteristic graph representing a split ratio (an injection rate under compression stroke) and exhaust gas temperature.
Figure 6:
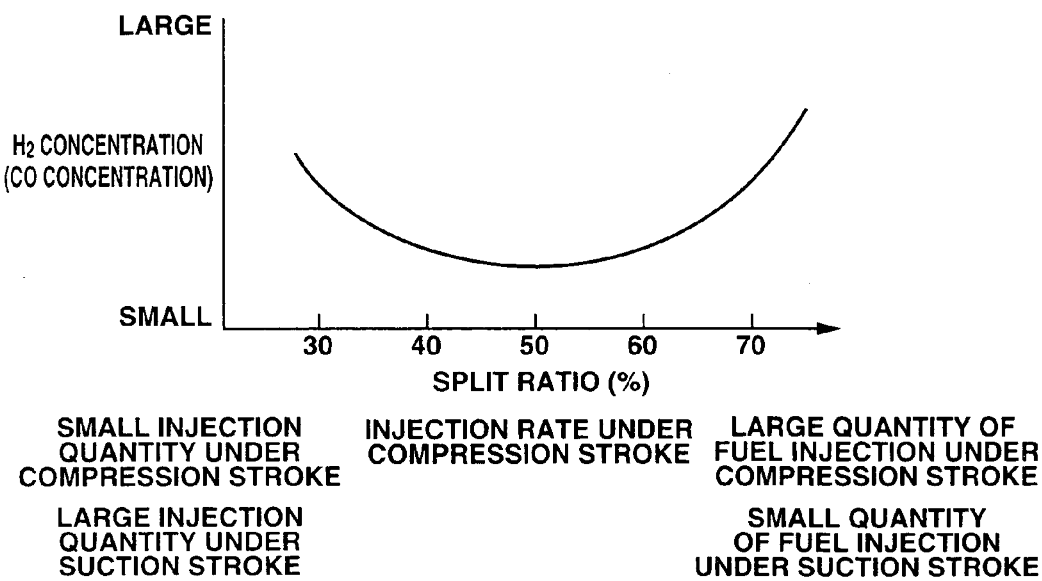
FIG. 6 is a characteristic graph representing the spilt ratio and hydrogen ($H_2$) concentration.

FIG. 5 shows a relationship between a split ratio (compression stroke injection rate) and exhaust (gas) temperature. As the rate of fuel injection under the compression stroke to a total fuel injection quantity for four strokes per cylinder becomes larger, the exhaust (gas) temperature is raised. FIG. 6 shows a relationship between a relationship between the split ratio (the above-described rate at which the fuel under the compression stroke is injected) and $H_2$ (hydrogen) concentration (CO (carbon monoxide) concentration) in the exhaust gas. When the rate of fuel injection quantity under the compression stroke is placed in the vicinity to 50%, the concentration of $H_2$ becomes minimized. As the rate of fuel injection during the compression stroke becomes larger than 50%, the $H_2$ concentration becomes increased.

Figure 7:
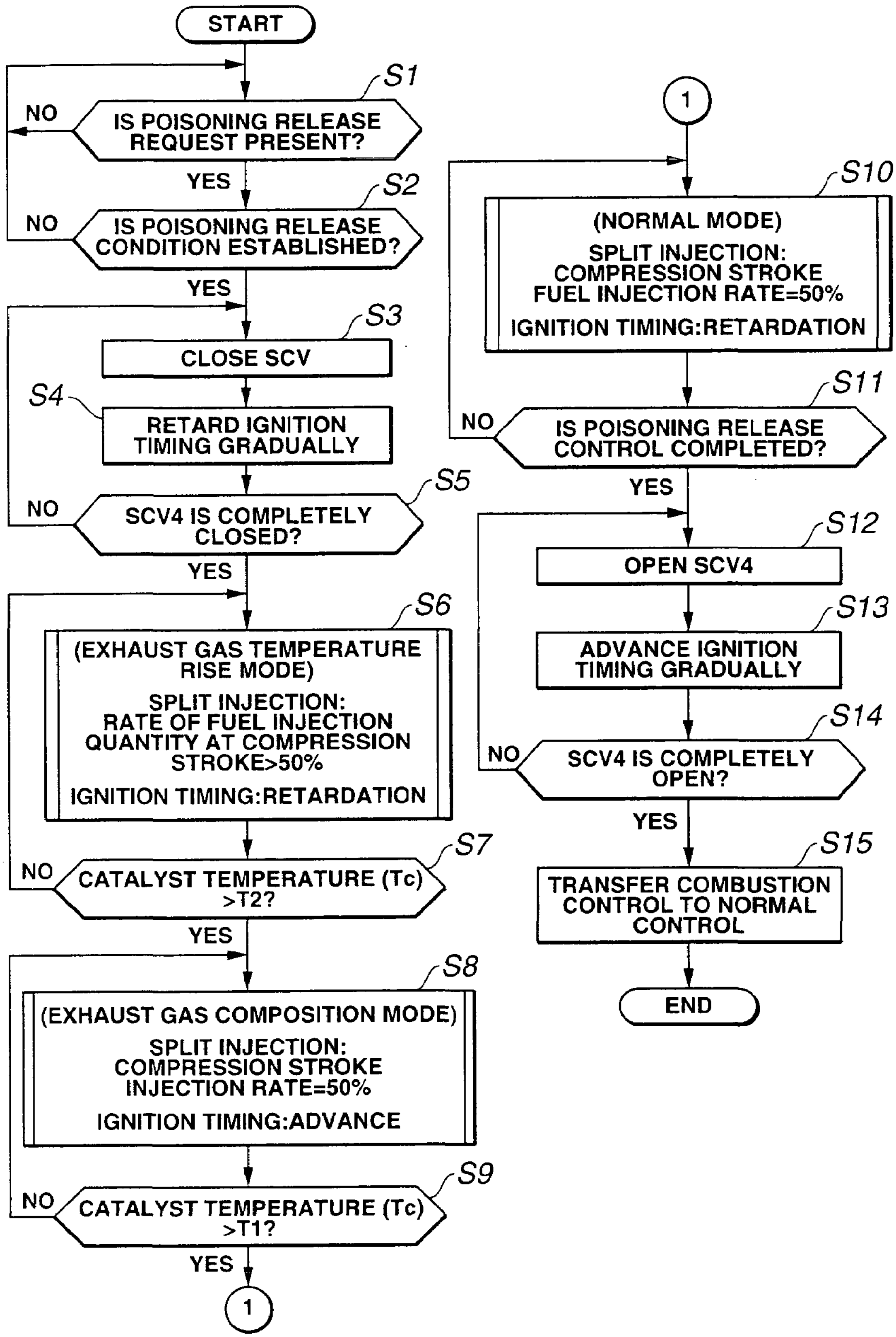
FIG. 7 is a poisoning release control flowchart executed in a first preferred embodiment of the exhaust purification apparatus according to the present invention.

The poisoning release control executed in the first embodiment of the exhaust purification apparatus according to the present invention will be described with reference to a flowchart of FIG. 7 described in the first embodiment and an integrated timing chart of FIGS. 8A through 8G.

At a step of S1, controller (control unit) 20 determines whether a demand on the positioning release is present. Specifically, controller 20 samples the intake air quantity Qa correlated to the exhaust gas flow quantity for each time unit, accumulates the sampled intake air quantities, and estimates an SOx poisoning quantity for NOx trap catalyst 11 on the basis of the accumulated value described above. If this estimated value of poisoning quantity of SOx for NOx trap catalyst 11 is compared with a predetermined estimated threshold value. If SOx accumulated quantity>threshold value, controller 20 determines that the poisoning demand is present. Or, if NOx concentration at the downstream side of NOx trap catalyst 11 is detected by means of NOx concentration at the downstream side of NOx trap catalyst 11 is detected. If controller 20 determines that NOx concentration is larger than its predetermined threshold value, controller 20 determines that the poisoning release demand is present. Or alternatively, if the concentration of NOx at the downstream side of NOx catalyst 11 by means of NOx concentration sensor 30 is larger than another predetermined threshold value, controller 20 determines that there is a poisoning release demand. It is noted that, other than OR condition, AND condition may be used to determine the demand presence on the poisoning release. If Yes at step S1, the routine goes to a step S2.

At step S2, controller 20 determines whether a predetermined release condition is established. The poisoning release condition is, for example, such that the present driving condition is the homogeneous stoichiometric combustion and the vehicle speed (vehicular velocity) VSP falls within a predetermined range (from a lower limit vehicular velocity to an upper limit vehicular velocity). If the poisoning release condition is established, the routine goes to a step S3. At step S3, prior to a start of the poisoning release control, swirl control valve (SCV) 4 is driven to the closed state. At a step S4, the ignition timing is gradually retarded from an MBT (Minimum Advance for Best Torque) ignition timing point. At a step S5, controller 20 determines whether swirl control valve 4 is controlled at a full (complete) close position. Then, at a step S5, controller 20 determines whether swirl control valve 4 is completely closed (a predetermined time has passed from a time at which a close command is issued). If Yes at a step S5, the routine goes to a step S6. At step S6, controller 20 executes the exhaust gas rise temperature mode as a first stage of the poisoning release control. In the exhaust gas temperature rise mode, while the whole air-fuel ratio is maintained at the stoichiometric air-fuel ratio ($\lambda$=1), the fuel injection is split into the suction stroke injection and the compression stroke injection. In this addition, the rate of injection quantity of the injection under the compression stroke (split ratio) to the total fuel injection quantity for four strokes of the engine per cylinder is set to be larger than 50%. For example, with 60% through 70%, compression stroke injection quantity is larger than (>) suction stroke injection quantity.

That is to say, as appreciated from FIG. 5, an improvement in temperature rise characteristic is made using the large split ratio to achieve a large exhaust gas temperature rise effect. The ignition timing is largely retarded. The rise in the exhaust (gas) temperature is carried out by this retardation of the ignition timing. It is noted that the ignition timing set at the retardation angle direction is more retarded than that during a normal homogeneous combustion. At a step S7, controller 20 determines whether catalyst temperature Tc detected by catalyst temperature sensor 29 is in excess of a second predetermined catalyst temperature T2 which is a temperature at which the poisoning release control is started (for example, 600° C.). If not exceeded (No) at step S7, the exhaust temperature rise mode is continued at step S6. If the catalyst temperature Tc becomes high and is in excess of second predetermined value T2 (Yes), the routine goes to a step S8. At a step S8, the poisoning release control in exhaust gas composition mode is executed as a second stage of the poisoning release control. In the exhaust gas composition mode, while the whole air-fuel ratio is maintained at stoichiometric air-fuel ratio ($\lambda$=1), the fuel injection is split into suction stroke injection and compression stroke injection and the rate of compression stroke injection quantity (split ratio) is 50%. Compression stroke fuel injection quantity=suction stroke fuel injection quantity. Then, the ignition timing is largely advanced. That is to say, since the ignition timing is largely advanced, the concentration of $H_2$ in the exhaust gas is increased as appreciated from, FIG. 4A. Thus, as appreciated from FIG. 2, the poisoning release performance is improved. It is, however, noted that the ignition timing set at the advance angle direction is more retarded than the normal homogeneous combustion. At the next step S9, controller 20 determines whether catalytic temperature Tc is in excess of first predetermined value T1 at which the poisoning release performance becomes stable (for example, 650° C.). If not exceeded (No) at step S9, the routine returns to step S8 to continue the exhaust gas composition mode. If the catalyst temperature Tc is increased and is in excess of first predetermined value T1 (Yes) at step S9, the routine goes to a step S10.

At step S10, as a third stage of the poisoning release control, the control of the normal mode is executed. In the normal mode, while the whole air-fuel ratio is maintained at the stoichiometric air-fuel ratio ($\lambda$=1), the fuel injection is split into suction stroke fuel injection and compression stroke fuel injection and the rate of fuel injection quantity under the compression stroke (split ratio) which is 50%. As appreciated from FIG. 2, this is because a sufficient poisoning release performance can be obtained even when $H_2$ concentration in the exhaust gas is reduced. It is of course that the ignition timing set at the retardation angle direction is further retarded than that set at the normal homogeneous combustion. At the next step S11, controller 20 determines whether the poisoning release has been completed. Specifically, during the poisoning release control, a predetermined poisoning release quantity is subtracted from the estimated value of NOx trap catalyst 11 on the basis of the accumulated value of intake air quantity Qa to estimate the remaining quantity of Sox poisoning release quantity for each unit time. If the estimated value of Sox poisoning quantity is compared with a predetermined lower limit side threshold value, controller 20 determines that the poisoning release control is completed when Sox accumulated quantity<threshold value (at step S11). In addition, when NOx concentration detected at the downstream side of the NOx trap catalyst 11 by means of NOx concentration sensor 30 is detected and is made smaller than a predetermined lower limit threshold value, controller 20 determines that the poisoning release control is completed. In this case, other than OR condition of both SOx accumulated quantity and NOx concentration at the downstream side of NOx trap catalyst 11, AND condition may be used to determine the completion of the poisoning release control.

If controller 20 does not determine that the poisoning release control is completed, the normal mode at step S10 is continued. If poisoning release completion is not determined, the routine goes to a step S12 to transfer the combustion control to the normal one. At step S12, controller 20 drives swirl control valve (SCV) 4 into the open direction prior to the transfer toward the normal combustion control. At a step S13, controller 20 gradually advances the ignition timing toward MBT ignition timing point. At a step S14, controller 20 determines whether SCV 4 is controlled to be completely opened whether a predetermined period of time has passed from a time at which the open command is issued. If Yes at step S14, the routine goes to a step S15. At step S15, controller 20 transfers the combustion control to the normal combustion control (homogeneous stoichiometric combustion). That is to say, upon the completion of the split injection, the fuel injection pattern is returned to the normal injection (normally, during the suction stroke) and the ignition timing is controlled at the target of MBT point ignition timing. It is noted that, if, during the poisoning release control, the poisoning release control is suspended when a combustion control demand having a high priority occurs, the poisoning release command is suspended so that the control transfers to the combustion control which meets the demand. Next, a further detail of each mode (exhaust gas temperature rise mode, exhaust gas composition mode, and normal mode) in the poisoning release control will be described below.

(Exhaust (Gas) Temperature Rise Mode)

Next, a further detail of each mode (exhaust gas temperature rise mode, exhaust gas compression mode, and the normal mode) in the poisoning release control will be described below. Together with a start of the poisoning release control (provided after SCV 4 is completely closed), the executions of the split injection and the ignition timing retardation in the same way as the normal mode start the control in exhaust gas temperature rise mode in temperature to a temperature at which the catalyst temperature rise to a temperature at which SOx poisoning release is started. A point which is different from the normal mode is the setting of the rate of fuel injection quantity under the compression stroke at any value of percentage larger (60% to 70%) than the case of the normal mode (about 50%).

A characteristic of exhaust gas temperature caused by the split injection is such that as the split ratio becomes larger, that is to say, as the rate of compression stroke injection quantity becomes larger, the exhaust gas temperature tends to become raised, as viewed from the relationship between the split ratio (the rate of injection quantity under the compression stroke) and exhaust gas temperature in FIG. 5. This is because, as the injection quantity under compression stroke is increased, an uncombusted fuel is present in the vicinity to spark plug 9 to develop CO and HC and the lean air-fuel mixture is formed in the neighborhood of the cylinder wall surface. During an initial combustion interval immediately after the ignition of fuel, a part of space in combustion chamber 7 surrounding spark plug 9 is excessively and locally rich. Hence, a moderate combustion whose flame propagation speed is slow in resulted. Furthermore, during a combustion interval from a middle period to a final period, the air-fuel mixture becomes lean in the vicinity to the cylinder wall surface. This results in a further moderate combustion. Due to an extension of the final combustion interval, CO and HC developed around spark plug 9 gradually reacts with $O_2$ present in the vicinity to the cylinder wall surface during the combustion. Thus, the after burning is promoted. Hence, the exhaust gas temperature rise mode having a large compression stroke injection quantity rate permits a quick rise in the exhaust gas temperature and a rise in the catalyst temperature Tc. Consequently, the poisoning release time can be shortened.

[Exhaust Gas Composition Mode]

After catalyst temperature Tc has reached to the temperature (second predetermined value T2, for example, 600° C.), the control is transferred to the exhaust gas composition mode in which $H_2$ (hydrogen) concentration of the exhaust gas composition after the combustion is increased to change the exhaust gas composition to improve the poisoning release efficiency. In the exhaust gas composition mode, the split injection is carried out in the same manner as the normal mode and exhaust gas temperature rise mode. The difference point from the normal mode and from the exhaust gas temperature rise mode is as follows: That is to say, the ignition timing is set toward the advance angle direction. It is noted that the split ratio (rate of injection quantity during the compression stroke) is set to the same as that in the normal mode (about 50%) and is decreased as against the exhaust gas temperature rise mode. It will be appreciated from FIGS. 2 and 3 that immediately after catalyst temperature Tc has reached to the temperature at which the poisoning release control is started, a sufficient poisoning release quantity cannot be obtained due to the low catalyst temperature for the poisoning release efficiency. In addition, as a factor of improving the poisoning release efficiency under a low temperature condition, $H_2$ required to reduce SOx and CO and HC are practically increased in the combustion process. Thus, the poisoning release quantity needs to be increased. Furthermore, it will be appreciated that the poisoning release performance is furthermore improved due to the presence of $O_2$ during the reduction of SOx. Then, the control is carried out to achieve the sufficient poisoning release quantity even under the low catalyst temperature. As far as the actual exhaust gas characteristic is concerned, FIGS. 4A and 4B shows relationships between the ignition timing in the case of the split injection and $H_2$ concentration ($O_2$ concentration). It will be appreciated from FIGS. 4A and 4B that $H_2$ concentration (CO concentration) and $O_2$ concentration can be doubled or more by advancing the ignition timing toward, for example, 25°BTDC (Before Top Dead Center) with respect to a retardation angle direction (10°BTDC) of the ignition timing. Hence, in the exhaust gas temperature rise mode demanding a rapid rise in temperature, the ignition timing is set toward the retardation angle direction. However, in the exhaust gas composition mode requiring the improvement in the poisoning release efficiency to start the rapid temperature rise, the ignition timing is set toward the advance angle direction. This can achieve the exhaust gas composition which improves a poisoning release efficiency in order to improve the poisoning release control efficiency during the temperature rise process of the exhaust gas. In addition, the supply of $O_2$ promotes the oxidization reaction. The promotion of oxidization reaction causes a reduction in the exhaust gas temperature rise characteristic to be compensated for the reduction in the exhaust gas capacity along with the advance angle of the ignition timing angle. The temperature rise characteristic is not worsened. A combustion efficiency will be described in a case of the split injection. If the ignition timing is retarded, the ignition is delayed so that a thermal generation rate is reduced and a reduction of a total thermal generation quantity occurs. In order to obtain the same development torque, the air quantity is increased with respect to the setting of advance angle of ignition timing (in actual manner of fact, the opening angle of the throttle valve is increased). A total fuel injection quantity is accordingly increased. Thus, an exhaust capacity after the combustion is increased. Hence, the setting of the ignition timing retardation in the case of the split injection cannot avoid the worsening of fuel consumption. In the exhaust gas temperature rise mode, it cannot help neglecting the worsening of fuel consumption due to the setting of the ignition timing advance angle toward the retardation angle direction. Since the exhaust gas temperature rise is a main object in the exhaust gas temperature rise mode. In this respect, in the exhaust gas composition mode, the ignition timing may be set to the advance angle so that the fuel consumption may be improved. In addition, in the exhaust gas composition mode, the reduction in the split ratio (injection quantity during the compression stroke) as against the exhaust gas temperature rise mode is a good practice in terms of a relief of the worsening of the fuel consumption.

[Normal Mode]

After catalyst temperature Tc has reached to the predetermined temperature (first predetermined temperature (first predetermined value of T1), for example, 650° C.), the control is transferred to that of the normal mode to maintain the catalyst temperature. In the normal mode, the split injection is carried out in the same manner as the exhaust gas temperature rise mode and the exhaust gas composition mode. The difference point from the exhaust gas composition mode is the setting of ignition timing toward the retardation angle direction in the same way as the exhaust gas temperature rise mode. This temperature range is a region in which the poisoning release performance hardly receives an influence on the exhaust gas composition, as shown in FIG. 2, and in which the poisoning release performance is predominated by a temperature, as shown in FIG. 2. Hence, it is important to hold catalyst temperature Tc since the poisoning release performance becomes worse. Since no rapid temperature rise is requested (demanded), the split ratio (fuel injection quantity under compression stroke) for the exhaust gas temperature rise mode is decreased so that the worsening of the fuel consumption can be relieved and, on the other hand, the ignition timing is set again toward the retardation angle direction. However, since no temperature rise demand is present more than necessity, it becomes unnecessary to use the set value of the split ratio such that an extreme worsening of fuel economy is present. However, if the worsening of the fuel economy is relieved due to the fuel injection during the compression stroke, there is a possibility that the exhaust gas temperature is reduced. Hence, the injection timing is set toward the retardation angle direction but not toward the advance angle direction so that an exhaust capacity is increased and is maintained without a reduction in catalyst temperature Tc.

These series of control modes are executed in a well-balanced manner so that it becomes possible to carry out the poisoning release control with the poisoning release efficiency taken into account. Finally, the poisoning release control can be executed in a minimum necessary time limit. The worsening of the fuel consumption can be suppressed at minimum.

Figures 9A, 9B:
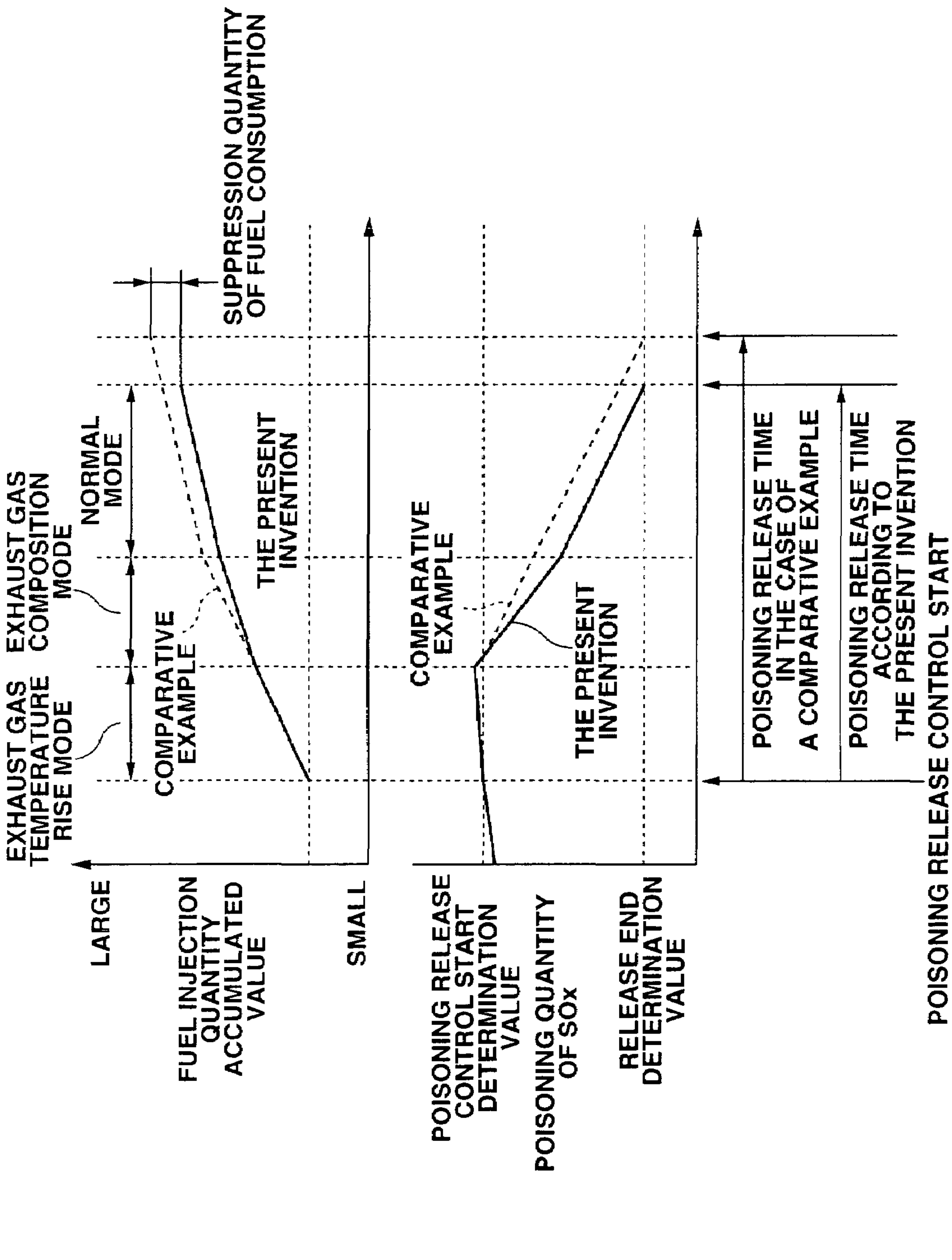
FIGS. 9A and 9B are integrally a timing chart for explaining an advantage of the exhaust purification apparatus in the first embodiment over a comparative example.

FIGS. 9A and 9B show that the above-described poisoning release control in the case of the first embodiment can suppress the worsening of fuel consumption while the poisoning release time can be shortened, as compared with a comparative example denoted by broken lines of FIGS. 9A and 9B. It is noted that, in the comparative example, the ignition timing is not set toward the advance angle direction during the interval of the exhaust gas composition mode but is set toward the retardation angle direction. That is to say, in the case of the first embodiment, during the exhaust gas composition mode, the ignition timing is advanced to increaset $H_2$ component in the exhaust gas so that SOx release quantity during this mode can be increased and, accordingly, the poisoning release time can be shortened. During the exhaust gas composition mode, the ignition timing is advanced to improve the engine output performance. Especially, a torque reduction (a torque hesitation) during a high engine load region is not present. The fuel injection quantity to obtain the same output torque can be reduced. Accordingly, the poisoning release time can be shortened and the worsening of the fuel economy can be suppressed.

According to the first embodiment of the exhaust purification apparatus, the poisoning release control is carried out including the normal mode and exhaust gas composition mode before the normal mode. In the exhaust gas composition mode, a manipulation parameter (or called, a driving parameter) of an engine related to the exhaust gas composition is manipulated so that $H_2$ concentration in the exhaust gas is higher than that in the normal mode. Thus, before and after the catalyst temperature reaches to the temperature required for the poisoning release, optimum exhaust gas compositions therebefore and thereafter are formed. Thus, an increase in the efficiency of the poisoning release causes the shortening of the poisoning release time so that the worsening of the fuel economy can be suppressed to a minimum. In this embodiment, when the exhaust gas composition mode is switched to the normal mode when catalyst temperature Tc is in excess of first predetermined value T1, the difference in the demand in accordance with catalyst temperature Tc can be coped with according to the present invention. In addition, an optimum mode transition from the exhaust gas composition mode to the normal mode can be achieved by setting first predetermined value T1 to the temperature at which the poisoning release performance is stable.

In addition, according to the exhaust purification apparatus in the first embodiment, the ignition timing in the exhaust gas composition mode is set toward more advance angle direction than that in the normal mode. Thus, $H_2$ concentration in the exhaust gas is increased so that the poisoning release performance can remarkably be improved.

In addition, according to the first preferred embodiment of the exhaust purification apparatus, during the poisoning release control, the fuel injection through a direct-ignited fuel injection valve (fuel injector 8) is split into the suction stroke injection and compression stroke injection so that the exhaust gas temperature can be raised to the temperature required for the poisoning release quickly. In addition, the whole air-fuel ratio in the split injection indicates substantially stoichiometric air-fuel ratio. Thus, the worsening of fuel consumption can be suppressed. In addition, in the first embodiment, the poisoning release control is executed in such a way that the poisoning release control further includes the exhaust gas temperature rise mode before the exhaust gas composition mode. In the exhaust gas temperature rise mode, the rate of fuel injection quantity is made larger than the normal mode (and exhaust gas composition mode) so that the temperature rise efficiency in the exhaust gas temperature rise mode can be improved. In addition, the rate of compression stroke injection in the exhaust gas temperature rise mode is larger than the exhaust gas composition mode which is made smaller than the exhaust gas composition mode. Consequently, the worsening of the fuel consumption in the exhaust gas composition mode can be suppressed.

In addition, in the first embodiment of the exhaust purification apparatus according to the present invention, the ignition timing in the exhaust gas temperature rise mode is set to the retardation angle direction than the exhaust gas composition mode so that the temperature rise performance in the exhaust gas temperature rise mode can be improved. In the preferred embodiment, the mode is switched from the exhaust gas temperature rise mode to the exhaust gas composition mode when catalyst temperature Tc is in excess of second predetermined value T2. Thus, the exhaust purification apparatus can cope with the difference in demand. In addition, since the second predetermined value is set to a temperature at which the poisoning release is started so that the optimum mode switching can be achieved.

According to the first embodiment of the exhaust purification apparatus, in the split injection in the exhaust gas temperature rise mode, the fuel injection quantity under compression stroke≈suction stroke fuel injection quantity. Consequently, the worsening of the fuel consumption can be suppressed.

In addition, in the first embodiment of the exhaust purification apparatus according to the present invention, the rate of injection under the compression stroke in the exhaust gas composition mode is smaller than that in the exhaust gas temperature rise mode and the ignition timing in the exhaust gas composition mode is more advanced than that in the exhaust gas temperature rise mode. Or, the rate of injection under the compression stroke in the exhaust gas composition mode is substantially equal to the normal mode and the ignition timing in the exhaust gas composition mode is more advanced than that in the normal mode. Thus, while suppressing the worsening of the fuel consumption in the exhaust gas composition mode, the poisoning release performance can be improved.

Figure 10:
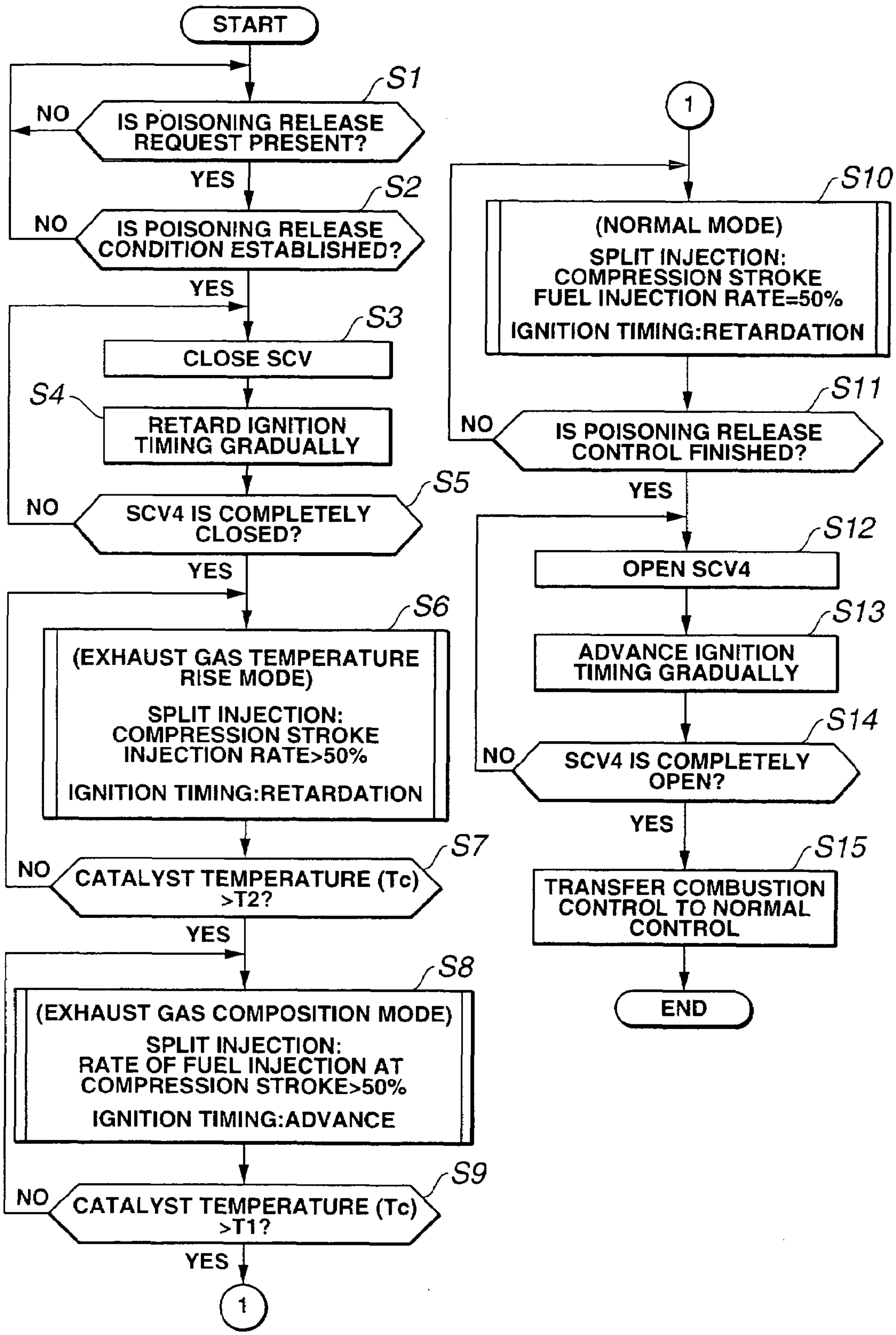
FIG. 10 is a poisoning release control flowchart executed in a second preferred embodiment of the exhaust purification apparatus according to the present invention.
Figures 11A, 11B, 11C, 11D, 11E, 11F, 11G:
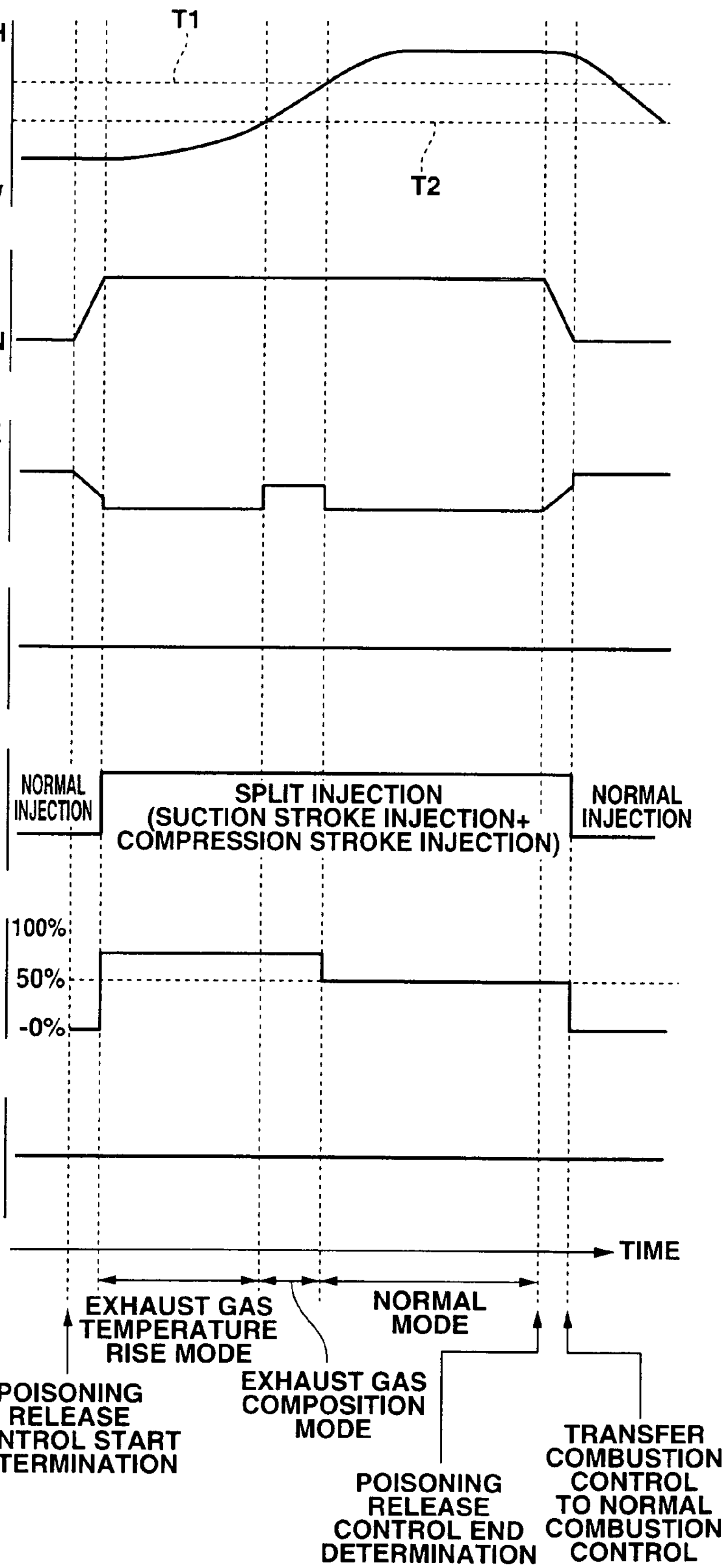
FIGS. 11A, 11B, 11C, 11D, 11E, 11F, and 11G are integrally a timing chart for explaining an operation of the poisoning release control in the case of a second preferred embodiment of the exhaust purification apparatus according to the present invention.

The poisoning release control executed in a second preferred embodiment of the exhaust purification apparatus according to the present invention will be described with reference to a flowchart in FIG. 10 and with reference to an integrated timing chart in FIGS. 11A through 11G. The structure of the exhaust purification apparatus in the second embodiment is generally the same as described in the first embodiment. Thus, a difference point from the first embodiment will only be described below. These can be applied equally well to third and fourth preferred embodiments which will be described later.

In the exhaust gas composition mode of step S8 in the second embodiment (refer to FIG. 10), the fuel injection is split into the injection under the suction stroke and that under the compression stroke and the split ratio (the rate of injection under the compression stroke) is set to be larger than 50%, for example, set to 60% through 70% with fuel injection quantity under the compression stroke>fuel injection quantity under suction stroke. Then, the ignition timing is largely advanced. That is to say, in the second embodiment, the rate of injection quantity under the compression stroke is set to be large in the exhaust gas composition mode in the same manner as the exhaust gas temperature rise mode. Thus, $H_2$ concentration in the exhaust gas is augmented as shown in FIG. 6. The setting of the advance angle of the ignition timing causes the increase in $H_2$ concentration (refer to FIGS. 4A and 4B). The more increase in $H_2$ concentration aims at the further improvement in the poisoning release performance (refer to FIG. 2). In the second embodiment, the rate of injection quantity under the compression stroke in the exhaust gas composition mode is larger than the normal mode in the same way as the exhaust gas temperature rise mode. Thus, an increase effect of $H_2$ concentration in the exhaust gas composition mode is further increased and a more improvement in the poisoning release performance can be achieved.

Figure 12:
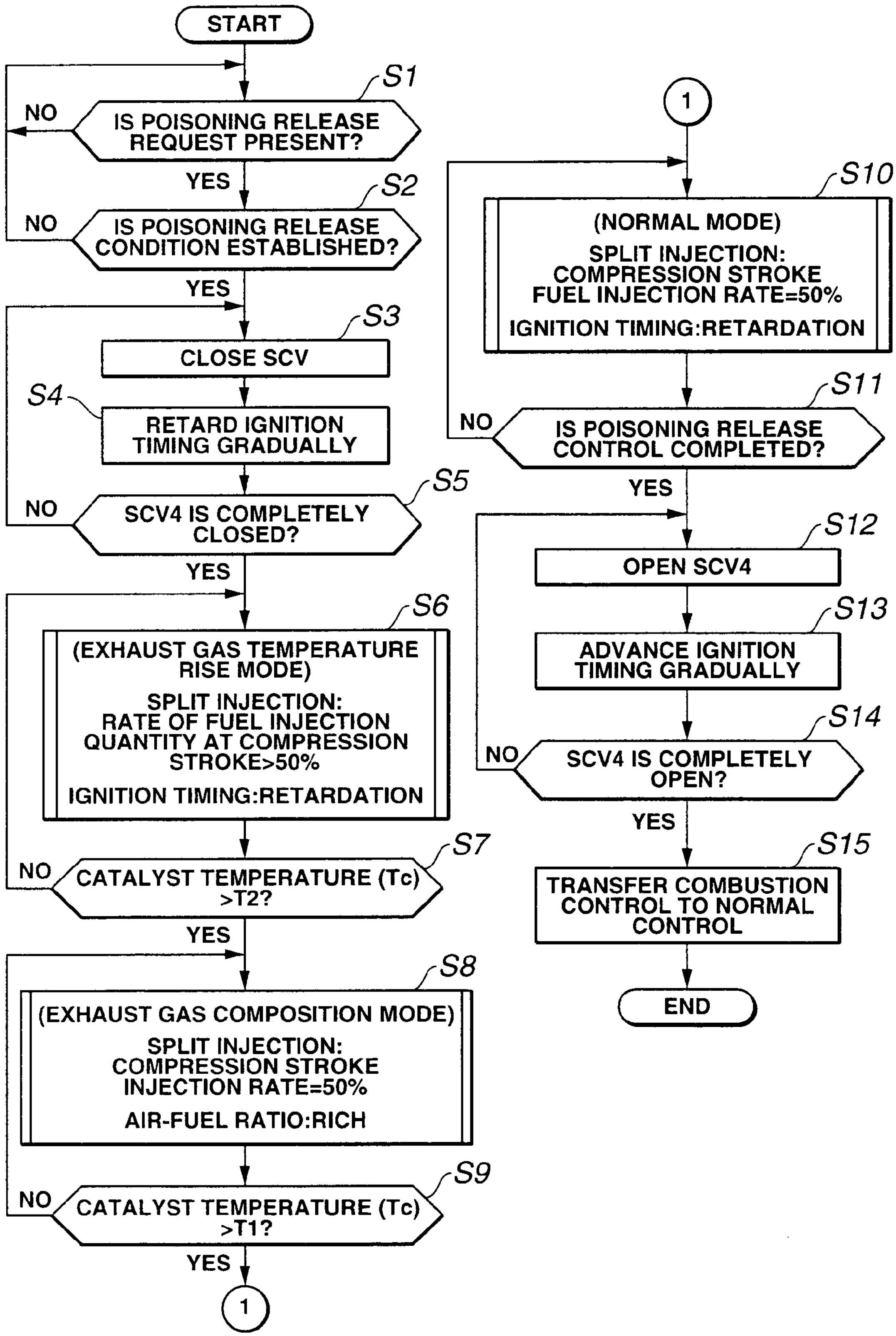
FIG. 12 is a poisoning release control flowchart executed in a third preferred embodiment of the exhaust purification apparatus according to the present invention.
Figures 13A, 13B, 13C, 13D, 13E, 13F, 13G:
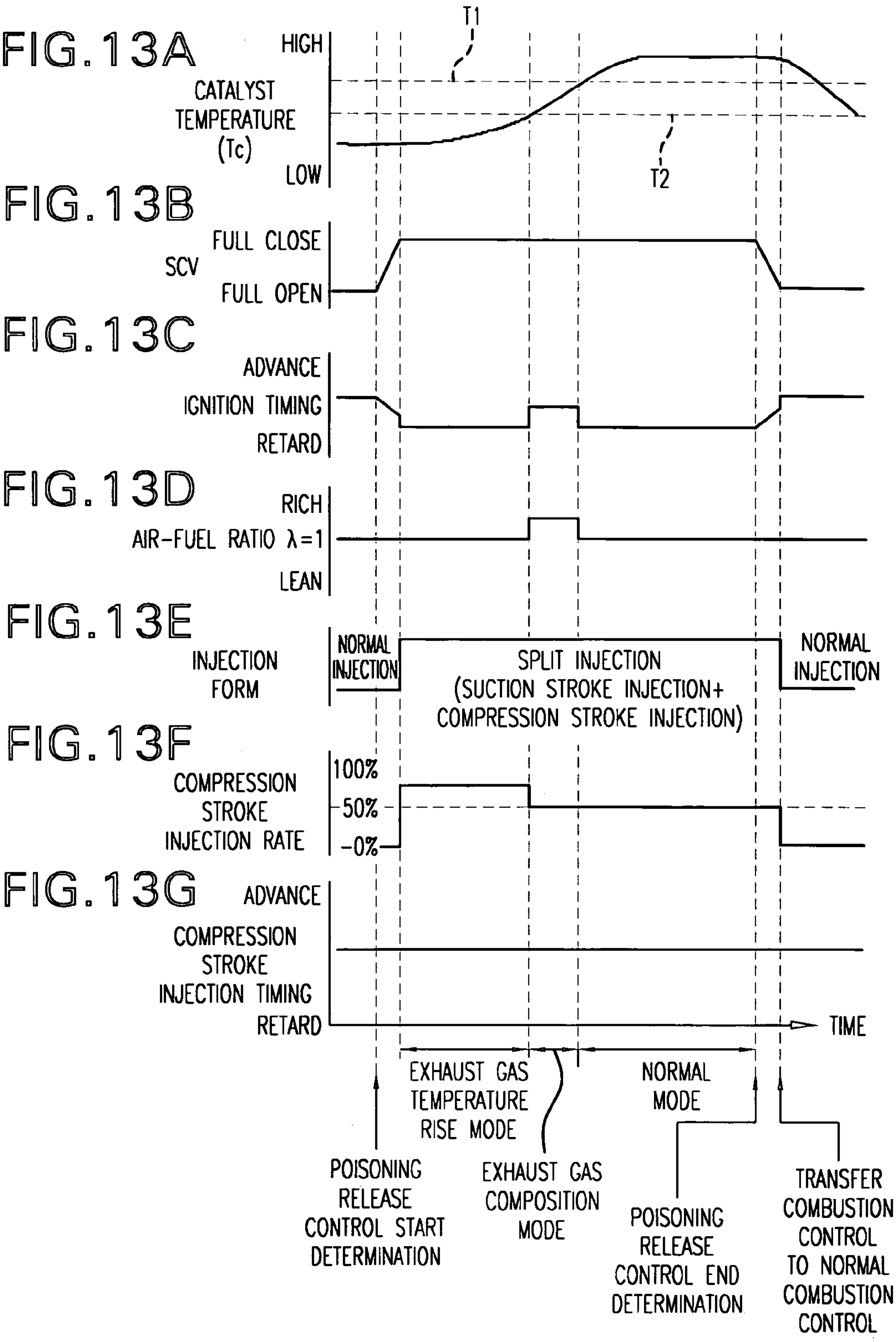
FIGS. 13A, 13B, 13C, 13E, 13F, and 13G are integrally a timing chart for explaining an operation of the poisoning release control in the case of the third embodiment of the exhaust purification apparatus according to the present invention.
Figure 14:
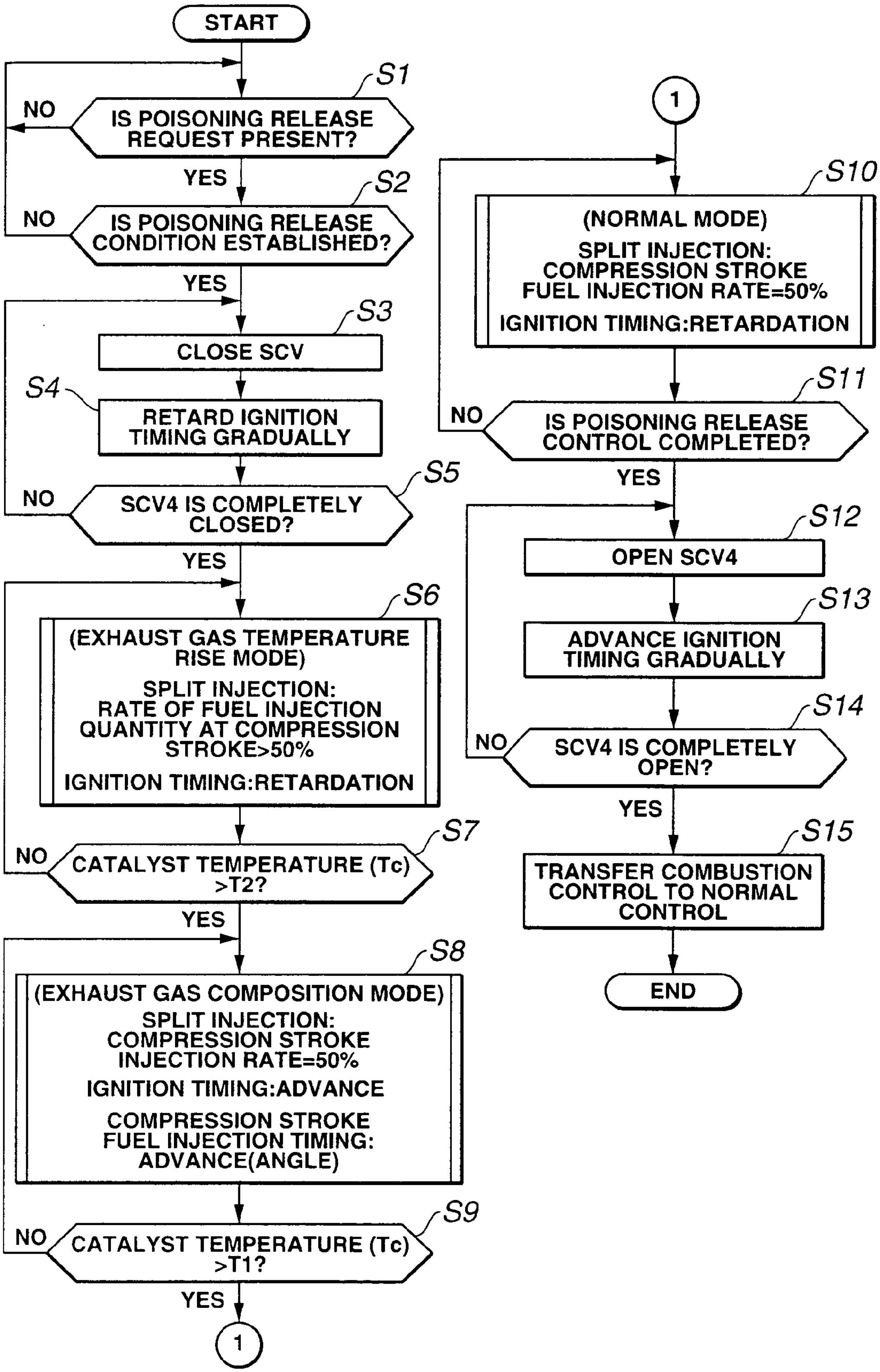
FIG. 14 is a poisoning release control flowchart executed in a fourth preferred embodiment of the exhaust purification apparatus according to the present invention.

Next, the poisoning release control executed in the third preferred embodiment of the exhaust purification apparatus will be described with reference to the flowchart shown in FIG. 12 and timing charts shown in FIGS. 13A through 13G. In the third embodiment, only the control in the exhaust gas composition mode at step S8 is different from that described in the first embodiment. At the exhaust gas composition mode of step S8 described in the third embodiment (refer to FIG. 12), the whole air-fuel ratio is enriched (λ>1), the fuel injection is split into the injection under suction stroke and that under the compression stroke, and the split ratio (the rate of injection quantity under the compression stroke) is set to 50%. This means that the fuel injection quantity under the compression stroke is equal to that under the suction stroke. Then, the ignition timing is largely advanced. That is to say, in the third embodiment of the exhaust purification apparatus, in the exhaust gas composition mode, together with the setting of the advance angle of the ignition timing, the air-fuel ratio is enriched. Together with the increase in CO in the exhaust gas, $H_2$ concentration is increased so that a further improvement in the poisoning release performance can be carried out. In the third embodiment, the whole air-fuel ratio in the exhaust gas composition mode is enriched than the normal mode or than the exhaust gas temperature rise mode. An increase effect in the $H_2$ concentration in the exhaust gas composition mode is made higher to improve the furthermore poisoning release performance.

Next, FIGS. 14 and 15A through 15G show the operational flowchart to which the poisoning release control executed in the fourth preferred embodiment of the exhaust purification apparatus according to the present invention and its timing charts in the fourth embodiment. The fourth embodiment is different from the first embodiment in only the control in the exhaust gas composition mode at step S8 of FIG. 14. In the fourth embodiment (refer to FIG. 14), at step S8 of the exhaust gas composition mode, while the whole air-fuel ratio is maintained at the stoichiometric air-fuel ratio ($\lambda=1$), the fuel injection is split into the suction stroke injection and the compression stroke injection and the split ratio (the rate of injection quantity under the compression stroke) is 50%. Thus, the injection quantity under the compression stroke is equal to that under the suction stroke. Then, the ignition timing is set largely toward the advance angle. In addition, the fuel injection timing under the compression stroke is set toward the advance angle direction. In the fourth embodiment, in the exhaust gas composition mode, the ignition timing is set toward the more advance angle direction and the fuel injection start timing under the compression stroke is set toward the advance angle direction. Together with the increase in CO in the exhaust gas, hydrogen ($H_2$) concentration is increased. Thus, the further improvement in the poisoning release performance can be made. According to the fourth embodiment of the exhaust purification apparatus, the fuel injection timing started under the compression stroke is set in the exhaust gas composition mode toward the more advance angle direction than the exhaust gas temperature rise mode and than the normal mode. The increase effect of $H_2$ concentration in the exhaust gas composition mode is increased. Thus, the further improvement in the poisoning release performance can be made. According to the fourth embodiment of the exhaust purification apparatus according to the present invention, the fuel injection timing under the compression stroke is set toward the more advance angle direction than the exhaust gas temperature rise mode and than the normal mode. The increase effect of $H_2$ concentration in the exhaust gas composition mode is remarkably improved and the further improvement in the poisoning release performance can be carried out. It is noted that the term of exhaust has the same meaning of the term of exhaust gas in this specification.

The entire contents of a Japanese Patent Application No. 2002-225239 (filed in Japan on Aug. 1, 2002) are herein incorporated by reference. The scope of the invention is defined with reference to the following claims.

What is claimed is:

1. An exhaust purification apparatus for an internal combustion engine, comprising:

an exhaust gas purification catalyst disposed in an exhaust passage of the engine; and a controller that executes a poisoning release control of the exhaust gas purification catalyst when a predetermined condition is established, the poisoning release control including a normal mode and an exhaust gas composition mode before the normal mode, a manipulation parameter of the engine related to an exhaust gas composition being manipulated in such a manner that a hydrogen concentration in the exhaust gas flowing into the exhaust gas purification catalyst in the exhaust gas composition mode is higher than that in the normal mode, and wherein, in the exhaust gas composition mode, an ignition timing is set more toward an advance angle direction than in the normal mode.

2. An exhaust purification apparatus for an internal combustion engine as claimed in claim 1, wherein a whole air-fuel ratio during the poisoning release control is approximately a stoichiometric air-fuel ratio.

3. An exhaust purification apparatus for an internal combustion engine as claimed in claim 1, wherein a whole air-fuel ratio in the exhaust gas composition mode is richer than that in the normal mode.

4. An exhaust purification apparatus for an internal combustion engine as claimed in claim 1, wherein a fuel injection timing of a fuel injection under a compression stroke in the exhaust gas composition mode is set more toward an advance angle direction than in the normal mode.

5. An exhaust purification apparatus for an internal combustion engine as claimed in claim 1, wherein the mode of the poisoning release control is switched from the exhaust gas composition mode to the normal mode when a temperature of the exhaust purification catalyst becomes high and is in excess of a first predetermined value.

6. An exhaust purification apparatus for an internal combustion engine as claimed in claim 5, wherein the first predetermined value is set to a temperature at which a poisoning release performance becomes stable.

7. An exhaust purification apparatus for an internal combustion engine as claimed in claim 1, wherein, during the poisoning release control, a fuel injection through a fuel injection valve used in a direct fuel injection is split into the injection under a suction stroke and that under a compression stroke.

8. An exhaust purification apparatus for an internal combustion engine as claimed in claim 7, wherein the poisoning release control further includes an exhaust gas temperature rise mode before the exhaust gas composition mode and, in the exhaust gas temperature rise mode, a rate of fuel injection quantity under the compression stroke to a total fuel injection quantity for four strokes of the engine is larger than that in the exhaust gas composition mode.

9. An exhaust purification apparatus for an internal combustion engine as claimed in claim 7, wherein the poisoning release control further includes an exhaust gas temperature rise mode before the exhaust gas composition mode and, in the exhaust gas temperature rise mode, a rate of a fuel injection quantity under the compression stroke to a total fuel injection quantity for four strokes of the engine per cylinder is larger than that in the exhaust gas composition mode and that in the normal mode.

10. An exhaust purification apparatus for an internal combustion engine as claimed in claim 7, wherein the poisoning release control further includes an exhaust gas temperature rise mode before the exhaust gas composition mode and, in the exhaust gas temperature rise mode, an ignition timing is set more toward a retardation angle direction than in the exhaust gas composition mode.

11. An exhaust purification apparatus for an internal combustion engine as claimed in claim 7, wherein the rate of the fuel injection quantity under the compression stroke in the exhaust gas composition mode is larger than that in the normal mode.

12. An exhaust purification apparatus for an internal combustion engine as claimed in claim 7, wherein the poisoning release control further includes an exhaust gas temperature rise mode before the exhaust gas composition mode and, in the exhaust gas temperature rise mode, a rate of a fuel injection quantity under the compression stroke to a total fuel injection quantity for four strokes of the engine per cylinder is larger than that in the normal mode.

13. An exhaust purification apparatus for an internal combustion engine as claimed in claim 12, wherein, when the temperature of the catalyst becomes high and is in excess of a second predetermined value, the mode is switched from the exhaust gas temperature rise mode to the exhaust gas composition mode.

14. An exhaust purification apparatus for an internal combustion engine as claimed in claim 13, wherein the second predetermined value is a temperature at which the poisoning release control is started.

15. An exhaust purification apparatus for an internal combustion engine as claimed in claim 12, wherein the fuel injection quantity is split into the fuel injection quantity under the compression stroke and that under the suction stroke and the fuel injection quantity under the compression stroke is larger than that under the suction stroke in the exhaust gas temperature rise mode.

16. An exhaust purification apparatus for an internal combustion engine as claimed in claim 12, wherein the fuel injection quantity is split into the fuel injection quantity under the compression stroke and that under the suction stroke and, in the exhaust gas composition mode, the fuel injection quantity under the compression stroke is substantially equal to that under the suction stroke.

17. An exhaust purification apparatus for an internal combustion engine as claimed in claim 12, wherein the fuel injection quantity is split into the fuel injection quantity under the compression stroke and that under the suction stroke and, in the normal mode, the fuel injection quantity under the compression stroke is substantially equal to that under the suction stroke.

18. An exhaust purification apparatus for an internal combustion engine as claimed in claim 12, wherein a rate of a fuel injection quantity under the compression stroke to a total fuel injection quantity for four strokes of the engine per cylinder in the exhaust gas composition mode is smaller than that in the exhaust temperature rise mode and an ignition timing in the exhaust gas composition mode is more advanced toward an advance angle direction than that in the exhaust temperature rise mode.

19. An exhaust purification apparatus for an internal combustion engine as claimed in claim 12, wherein a rate of a fuel injection quantity during the compression stroke to a total fuel injection quantity for the four strokes of the engine per cylinder in the exhaust gas composition mode is substantially equal to that in the normal mode and an ignition timing in the exhaust gas composition mode is more advanced toward the advance angle side than that in the normal mode.

20. An exhaust purification apparatus for an internal combustion engine as claimed in claim 12, wherein each rate of the fuel injection quantity under the compression stroke in the exhaust gas temperature rise mode and in the exhaust gas composition mode is larger than that in the normal mode.

21. An exhaust purification apparatus for an internal combustion engine as claimed in claim 12, wherein a whole air-fuel ratio in the exhaust gas composition mode is richer than that in the exhaust gas temperature rise mode.

22. An exhaust purification apparatus for an internal combustion engine as claimed in claim 12, wherein a fuel injection timing of a fuel injection under a compression stroke in the exhaust gas composition mode is set more toward an advance angle direction than in the exhaust gas temperature rise mode.

23. An exhaust purification apparatus for an internal combustion engine comprising:

an exhaust gas purification catalyst disposed in an exhaust passage of the engine; and a controller that executes a poisoning release control of the exhaust gas purification catalyst when a predetermined condition is established, the poisoning release control including a normal mode and an exhaust gas composition mode before the normal mode, an ignition timing in the exhaust gas composition mode being set more toward an advance angle direction than in the normal mode.

24. An exhaust purification apparatus for an internal combustion engine as claimed in claim 23, wherein the mode is switched from the exhaust gas composition mode to the normal mode, when a temperature of the catalyst becomes high and is in excess of a first predetermined value.

25. An exhaust purification apparatus for an internal combustion engine as claimed in claim 23, wherein the poisoning release control further includes an exhaust gas temperature rise mode before the exhaust gas composition mode and, in the exhaust temperature rise mode, the ignition timing is set more toward a retardation angle direction than in the exhaust gas composition mode.

26. An exhaust purification apparatus for an internal combustion engine as claimed in claim 25, wherein, during the poisoning release control mode, a fuel injection through a fuel injection valve used in a direct fuel injection is split into a fuel injection under a compression stroke and that under a suction stroke, and a rate of a fuel injection quantity under the compression stroke to a total fuel injection quantity for four strokes of the engine per cylinder in the exhaust gas temperature rise mode is larger than that in the exhaust gas composition mode.

27. An exhaust purification apparatus for an internal combustion engine as claimed in claim 25, wherein, during the poisoning release control, a fuel injection through a fuel injection valve used in a direct fuel injection is split into a fuel injection under a compression stroke and that under a suction stroke, and a rate of a fuel injection quantity under the compression stroke to a total fuel injection quantity for four strokes of the engine per cylinder in the exhaust gas temperature rise mode is larger than that in the normal mode.

28. An exhaust purification apparatus for an internal combustion engine as claimed in claim 25, wherein, during the poisoning release control, a fuel injection through a fuel injection valve used in a direct fuel injection is split into a fuel injection under a compression stroke and that under a suction stroke and a rate of a fuel injection quantity under the compression stroke for four strokes of the engine per cylinder in the exhaust gas temperature rise mode is larger than that in the exhaust gas composition mode and that in the normal mode.

29. An exhaust purification apparatus for an internal combustion engine as claimed in claim 25, wherein the mode is switched from the exhaust gas temperature rise mode to the exhaust gas composition mode when a temperature of the catalyst becomes high and is in excess of a second predetermined value.

30. An exhaust purification apparatus for an internal combustion engine as claimed in claim 25, wherein the ignition timing in the exhaust gas temperature rise mode is set more toward a retardation angle direction than during a normal homogeneous combustion.

31. An exhaust purification apparatus for an internal combustion engine as claimed in claim 25, wherein the ignition timing in the exhaust gas composition mode is set more toward a retardation angle direction than during a normal homogeneous combustion.

32. An exhaust purification apparatus for an internal combustion engine as claimed in claim 25, wherein the ignition timing in the normal mode is set more toward a retardation angle direction than during a normal homogeneous combustion.

33. An exhaust purification method for an internal combustion engine, the internal combustion engine comprising:

an exhaust gas purification catalyst disposed in an exhaust passage of the engine, and the exhaust purification method comprising:

executing a poisoning release control of the exhaust gas purification catalyst when a predetermined condition is established, the poisoning release control including a normal mode and an exhaust gas composition mode before the normal mode; and manipulating a manipulation parameter of the engine related to an exhaust gas composition in such a manner that a hydrogen concentration in the exhaust gas flowing into the exhaust gas purification catalyst in the exhaust gas composition mode is higher than that in the normal mode, and wherein, in the exhaust gas composition mode, an ignition timing is set more toward an advance angle direction than in the normal mode.

34. An exhaust purification method for an internal combustion engine the internal combustion engine comprising: an exhaust gas purification catalyst disposed in an exhaust passage of the engine; and the exhaust purification method comprising:

executing a poisoning release control of the exhaust gas purification catalyst when a predetermined condition is established, the poisoning release control including a normal mode and an exhaust gas composition mode before the normal mode; and setting an ignition timing in the exhaust gas composition mode more toward an advance angle direction than in the normal mode.

* * * * *